May 5, 1970   P. BEDFORD   3,509,978
CONVEYOR EQUIPMENT
Filed Sept. 27, 1967   2 Sheets-Sheet 1
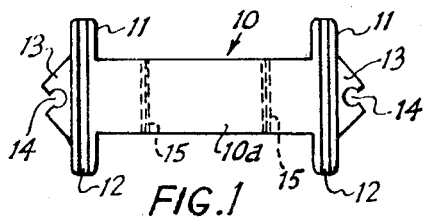
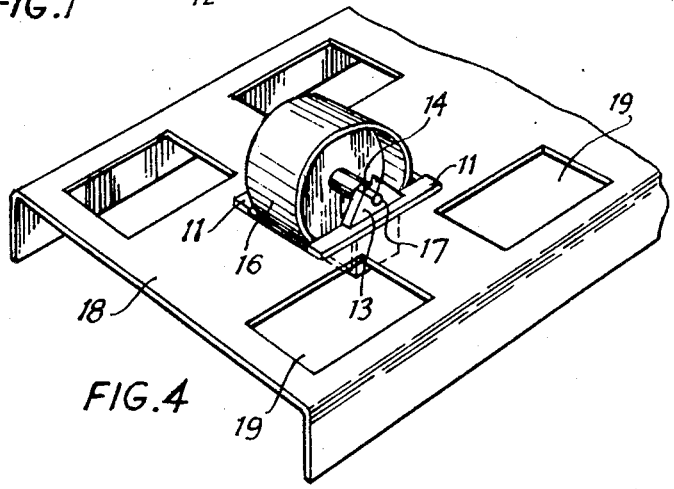
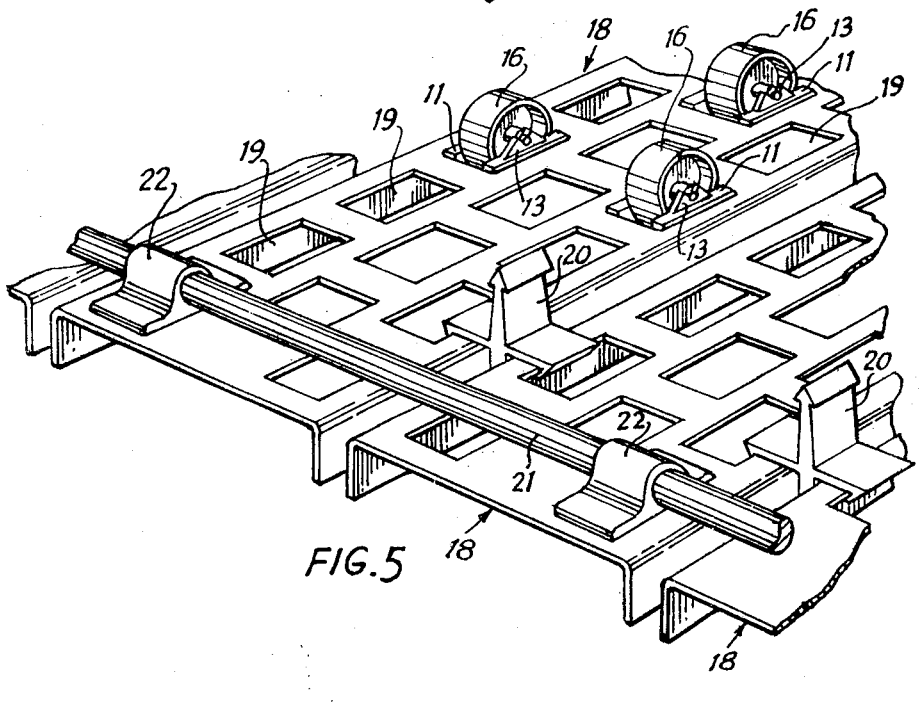
INVENTOR:
Philip Bedford
BY
Bierman & Bierman
Attorneys May 5, 1970  P. BEDFORD  3,509,978
CONVEYOR EQUIPMENT Filed Sept. 27, 1967  2 Sheets-Sheet 2

INVENTOR:
Philip Bedford
BY
Bierman + Bierman
Attorneys

United States Patent Office 3,509,978
Patented May 5, 1970

3,509,978
CONVEYOR EQUIPMENT
Philip Bedford, Knutsford, England, assignor to Atlantic Conveying Equipment Limited, a corporation of the United Kingdom
Filed Sept. 27, 1967, Ser. No. 670,851
Claims priority, application Great Britain, Sept. 30, 1966, 43,715/66
Int. Cl. B65g 13/00
U.S. Cl. 193—35                10 Claims

ABSTRACT OF THE DISCLOSURE

A gravity roller conveyor comprising a support surface having rectangular apertures into which either roller elements or retaining elements may be inserted to form a conveying surface. The elements are held in position by means of chip means associated with the elements.

---

This invention concerns conveyor equipment particularly, though by no means exclusively, suitable for use in construction of so-called live storage racking systems.

It is amongst the objects of the present invention to provide a set of standard parts which can be readily assembled to form a roller conveyor system especially a roller conveyor system for use in a live storage racking system with great flexibility according to predetermined design criteria.

According ot one aspect of the present invention a roller support member for use in the formation of a roller conveyor system comprises a roller support member comprising an element having spaced oppositely disposed limbs joined together by a connecting web, the ends of said limbs remote from said web being provided with integrally formed bearings adapted to receive the axle ends of a roller, each said bearing comprising an aperture having a slot leading thereto from the end of the web whereby the said axle ends may be removably clipped in the bearings and rotatably supported between said limbs, the outer surfaces of said limbs being provided with grooves adapted to engage resiliently and receive therewithin opposed edges upon a supporting structure to which the member is to be secured.

The invention will be further apparent from the following description with reference to the several figures of the accompanying drawings which show, by way of example only, two kinds of roller support member embodying the invention and a section of roller conveyor system utilising such roller support members.

Of the drawings:

FIG. 1 shows a plan view of a blank from which one kind of roller support member embodying the invention may be formed;

FIG. 4 shows the roller support member of either FIG. 2 or FIG. 3 secured in a conveyor bed and provided with a roller, thus to form a roller assembly; and FIG. 5 shows a perspective view of part of a roller conveyor system utilising the roller assembly of FIG. 4.

Figure 2:
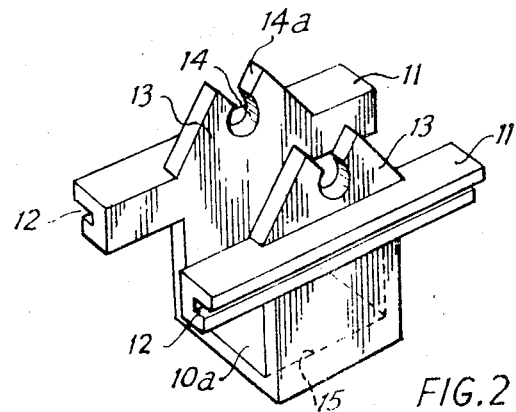
FIG. 2 shows a perspective view of the bank of FIG. 1 folded to form the support member.

Referring now to the drawings, and particularly to FIG. 1 thereof, a roller support member is formed from a generally I-shaped blank 10, having a web 10a and flanges 11. Each flange 11 is provided with a longitudinal groove 12 therein, and with a triangular extension 13 at one side thereof remote from the web 10a. Each extension 13 is provided with an aperture 14 having a lead in slot 14a thereto for a purpose which will be apparent hereinafter. Each web 10a is provided with two fold lines 15 extending transversely of the web 10a and a distance from the adjacent flange of approximately one quarter the length of the web.

To form a roller support member from such a blank the blank is folded along the fold lines 15 to form a U-shaped member as shown in FIG. 2.

Figure 3:
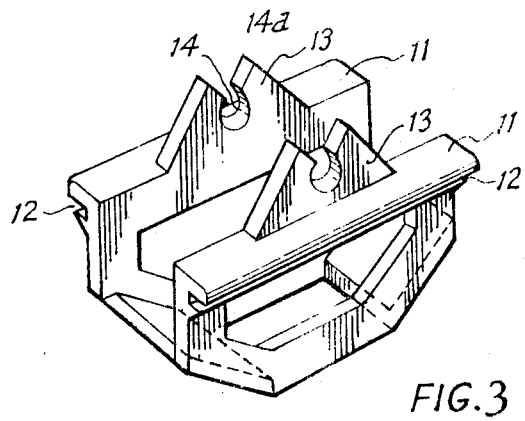
FIG. 3 shows a perspective view of a second kind of roller support member embodying the invention.

Referring now to FIG. 3 it will be seen that an alternative form of support member is similar to that of FIGS. 1 and 2, like parts being indicated by like reference numerals, but is formed initially with a generally U-shaped configuration and is not folded from a blank. For obvious reasons this alternative form has greater rigidity and is therefore preferred, its U-shaped configuration being stable.

Both the support members described above are formed from a resilient material so that the opposite limbs can be flexed inwardly to enable the member to be clipped between opposed edges of a supporting structure, such edges engaging the outwardly directed grooves 12 of the member. The members are preferably formed from a plastics material by an injection moulding process. When one of the support members is so located a roller comprising a central disc with a peripheral flange 16 forming the roller surface and stub axles 17 may be clipped into the support member to be rotatably supported therein, the axle ends being introduced into the apertures 14 through the lead in slots 14a for this purpose. A roller assembly comprising one of the roller support members with a roller mounted therein can be seen from FIG. 4.

The support structure which forms the bed of a roller conveyor system is preferably built up from one or more channel members 18 of any desired length provided with a plurality of rectangular apertures 19 in the web thereof each of which is capable of receiving one of the roller support members, the major edges of such aperture defining the opposed edges referred to hereinbefore (see FIGS. 4 and 5).

To build up a roller conveyor system for use for example in a live storage racking system the channel members 18 are secured in inverted disposition by a suitable frame work (not shown).

As can be seen from FIG. 5 adjacent co-planar members 18 may be interconnected by special clips 20 formed integrally with guide posts (if desired) to divide the conveyor bed into separate tracks. The structure may be strengthened by transverse rods 21 secured by saddle clips 22 which are themselves adapted to fit into the apertures 19. Roller assemblies comprising a roller support member and roller are then fitted into the apertures 19 in the manner described above in the desired numbers according to a predetermined pattern governed by the spacing of the rollers required for the type of goods to be conveyed.

It will be appreciated that the locations of the roller assemblies upon the members 18 may be quickly and easily changed to suit specified operating requirements by virtue of the simplicity of fixing of the roller assembly upon the members 18.

It will be appreciated that it is not intended to limit the invention to the above examples only, many variations being possible, such as might readily occur to one skilled in the art, without departing from the scope thereof, as defined by the appended claims.

What I claim is:

1. A roller support member comprising an element having spaced oppositely disposed limbs joined together by a connecting web, the ends of said limbs remote from said web being provided with integrally formed bearings adapted to receive the axle ends of a roller, each said bearing comprising an aperture having a slot leading thereto from the end of the web whereby the said axle ends may be removably clipped in the bearings and rotatably supported between said limbs, the outer surfaces of said limbs being provided with grooves adapted to engage resiliently and receive therewithin opposed edges upon a supporting structure to which the member is to be secured.

2. A roller support member according to claim 1, wherein said element is formed from a plastic material.

3. A roller conveyor system comprising a plurality of roller support members according to claim 1, a roller for engagement with each of said roller support members and a supporting structure adapted to secure each of said roller support members.

4. A roller conveyor system comprising a plurality of roller support members according to claim 2, a roller for engagement with each of said support members and a supporting structure adapted to secure each of said roller support members.

5. A system according to claim 3, wherein each of said rollers comprises a central disc having a peripheral flange whose outer surface defines the roller surface and stub axles extending from either side of said central disc adapted to engage the oppositely disposed bearings of said roller support member.

6. A system according to claim 4, wherein each of said rollers comprises a central disc having a peripheral flange whose outer surface defines the roller surface and stub axles extending from either side of said central disc adapted to engage the oppositely disposed bearings of said roller support member.

7. A system according to claim 3, wherein said support structure includes at least one channel member whose web is provided with a plurality of rectangular apertures each of which is adapted to receive one of said roller support members, the major edges of said apertures constituting said complementary formations.

8. A system according to claim 4, wherein said support structure includes at least one channel member whose web is provided with a plurality of rectangular apertures each of which is adapted to receive one of said roller support members, the major edges of said apertures constituting said complementary formations.

9. A system according to claim 5, wherein said support structure includes at least one channel member whose web is provided with a plurality of rectangular apertures each of which is adapted to receive one of said roller support members, the major edges of said apertures constituting said complementary formations.

10. A system according to claim 6, wherein said support structure includes at least one channel member whose web is provided with a plurality of rectangular apertures, each of which is adapted to receive one of said roller support members, the major edges of said apertures constituting said complementary formations.

References Cited

UNITED STATES PATENTS

| | | | |
|---|---|---|---|
| 2,172,380 | 9/1939 | Harris | 193—35 |
| 2,759,585 | 8/1956 | Timmons et al. | 193—37 |
| 2,990,929 | 7/1961 | Attwood | 193—35 |
| 3,118,529 | 1/1964 | Rubner | 193—37 |

FOREIGN PATENTS 1,091,709  11/1967  Great Britain.

ANDRES H. NIELSEN, Primary Examiner